No. 884,232. PATENTED APR. 7, 1908.
H. STAADT.
TANK HEATER.
APPLICATION FILED MAR. 22, 1907.
2 SHEETS—SHEET 1.
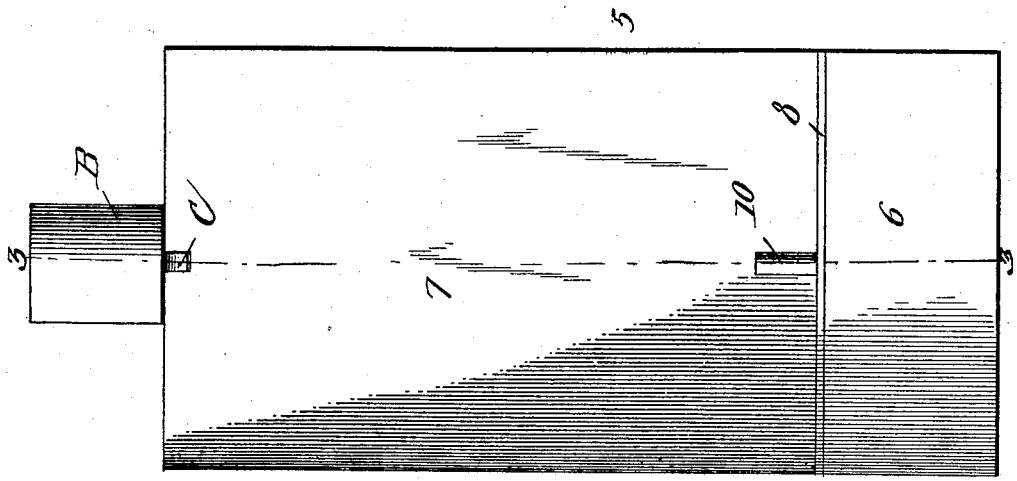
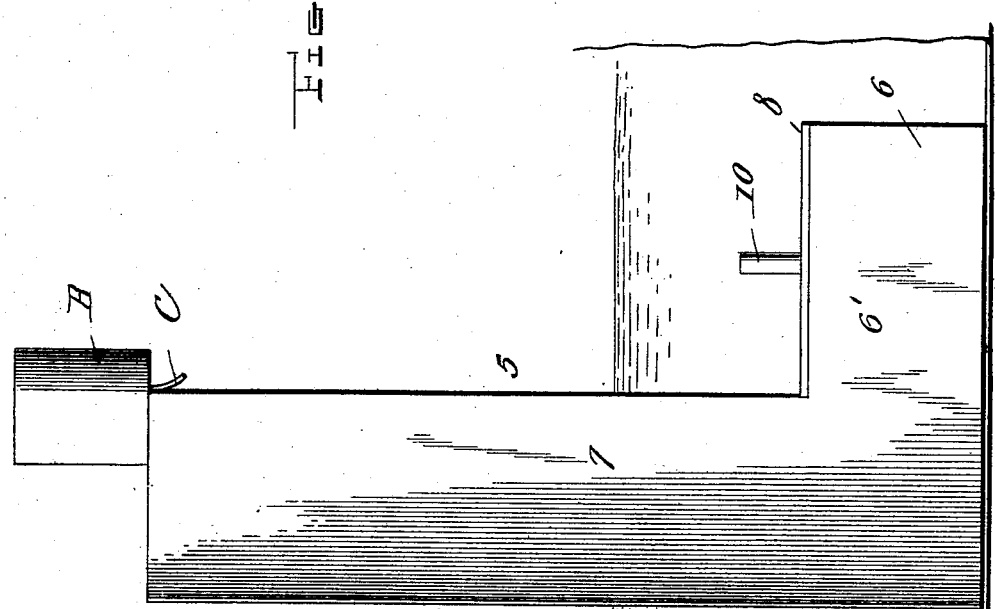
Inventor
Herman Staadt,
Witnesses

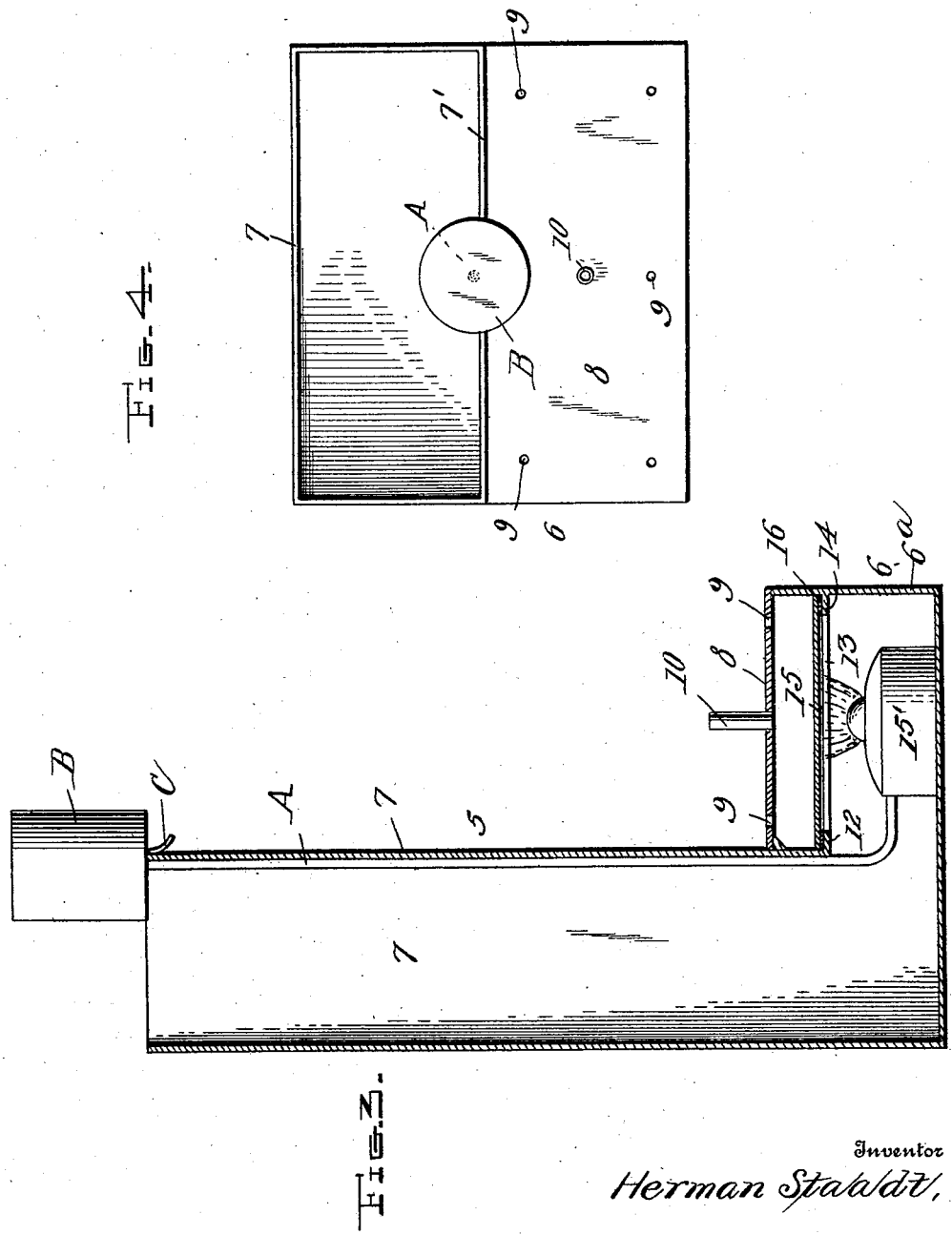

UNITED STATES PATENT OFFICE.

HERMAN STAADT, OF DOLA, OHIO.

TANK-HEATER.

No. 884,232.  Specification of Letters Patent.  Patented April 7, 1908.

Application filed March 22, 1907. Serial No. 363,890.

*To all whom it may concern:*

Be it known that I, HERMAN STAADT, citizen of the United States, residing at Dola, in the county of Hardin and State of Ohio, have invented certain new and useful Improvements in Tank-Heaters, of which the following is a specification.

This invention relates to heating apparatus and more particularly to heaters designed for use in water tanks and the like, to prevent freezing of the contents thereof.

The object is to provide a heater which will be extremely simple and thus cheap, and which will be arranged to subject a small portion of liquid to the influence of the heating agent at one time.

Other objects and advantages will be apparent from the following description, and it will be understood that changes in the specific structure shown and described may be made within the scope of the claims, without departing from the spirit of the invention.

In the drawings forming a portion of this specification, and in which like numerals of reference indicate similar parts in the several views, Figure 1, is an elevational view of the present invention, showing it in use in connection with a tank, Fig. 2, is a front view of the heater, Fig. 3, is a vertical section on line 3—3 of Fig. 2, Fig. 4, is a top plan.

Referring now to the drawings, the present invention comprises a hollow casing 5 including a horizontal base portion 6 and an upwardly extending vertical portion 7, connected with the base portion 6 at one end thereof. The portion 6 of the casing is open at its top as shown and is provided with a lid 8 for movement into and out of position to close the opening, and this top is provided with orifices 9 therein and with a centrally upwardly extending spout 10. The portion 7 of the casing has a front wall 7' which forms one end of the opening at the top of the portion 6, and against which one end of the lid 8 rests, when the lid is in closed position. As shown, this wall 7' extends downwardly below the lid 8, as indicated at 11, and carries a horizontally and forwardly extending rib 12 lying in a horizontal plane with other ribs 13 and 14 carried respectively by the side walls 6' and the front wall 6ª of the portion 6 of the casing. These ribs thus form a ledge for the reception of a plate 15 thereupon, gasket 16 being located between the ledge and the plate to prevent leakage of liquid into the casing. A lamp 15' is located within the horizontal portion 6 of the casing, and is disposed to heat the plate 15 and liquid lying between this plate and the lid 8. The lamp 15' is shown in the drawings as a gasolene torch the burner of which is located within the horizontal portion 6 and receives a supply of fuel through a pipe A communicating therewith and with a supply tank B resting upon the forward walls 7' of the casing and is held in position by means of the clip C engaged with the wall.

It will be understood that while access to the burner may be had by removing the lid 8 and plate 15, when the heater has been removed from the tank the lamp may also be removed from the casing by withdrawing the burner and supply pipe upwardly through the portion 5 of the casing, while the heater is in the tank.

It will be understood that the arrangement of the orifices 9 will admit a small quantity of liquid into the portion of the casing between the lid 9 and the plate 15, whereupon the liquid will be turned to steam, which in turn will force itself out through the pipe 10 and into the tank.

What is claimed is:

A tank heater comprising a casing including a vertical portion and a horizontal portion at the lower end thereof, a lid for the horizontal portion said lid having openings therein, a plate removably disposed within the horizontal portion in spaced relation to the lid, means for preventing the passage of liquid between the plate and the adjacent portions of the casing, and a lamp disposed within the horizontal portion of the casings in position to heat the plate.

In testimony whereof I affix my signature, in presence of two witnesses.

HERMAN STAADT.

Witnesses:
 ELI TRUMP,
 J. W. LANNING.